United States Patent

[11] 3,619,640

| [72] | Inventor | Emmet Mitchell Fulkerson<br>Cincinnati, Ohio |
|---|---|---|
| [21] | Appl. No. | 734,971 |
| [22] | Filed | June 6, 1968 |
| [45] | Patented | Nov. 9, 1971 |
| [73] | Assignee | General Electric Company |

[54] STEM OVERCURRENT PROTECTION
3 Claims, 3 Drawing Figs.

[52] U.S. Cl. .................................................. 307/131, 307/94
[51] Int. Cl. ................................................... H02h 3/08
[50] Field of Search ............................................ 307/93, 94, 130, 131; 317/31, 49, 50; 318/434

[56] References Cited
UNITED STATES PATENTS
2,914,704   11/1959   Nesler et al. .................. 307/94 UX Primary Examiner—Herman J. Hohauser
Attorneys—Derek P. Lawrence, Frank L. Neuhauser, Oscar B. Waddell, Lee H. Sachs, E. S. Lee, III and Joseph B. Forman ABSTRACT: A sensing circuit for use in an electrochemical machining apparatus for prevention of damage to said apparatus caused by a short circuit during the machining process wherein said sensing circuit includes a tracking and comparison circuit.

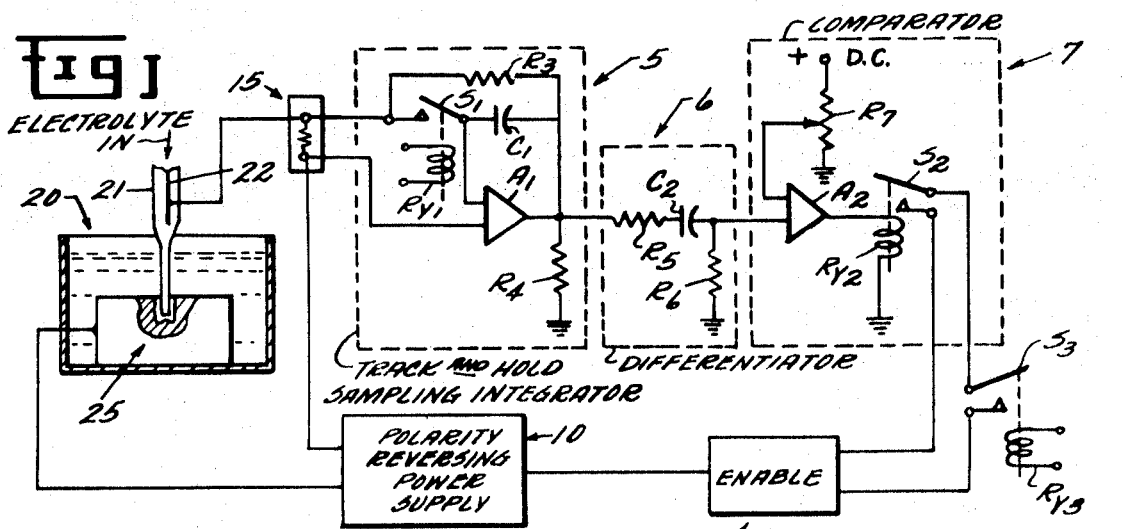
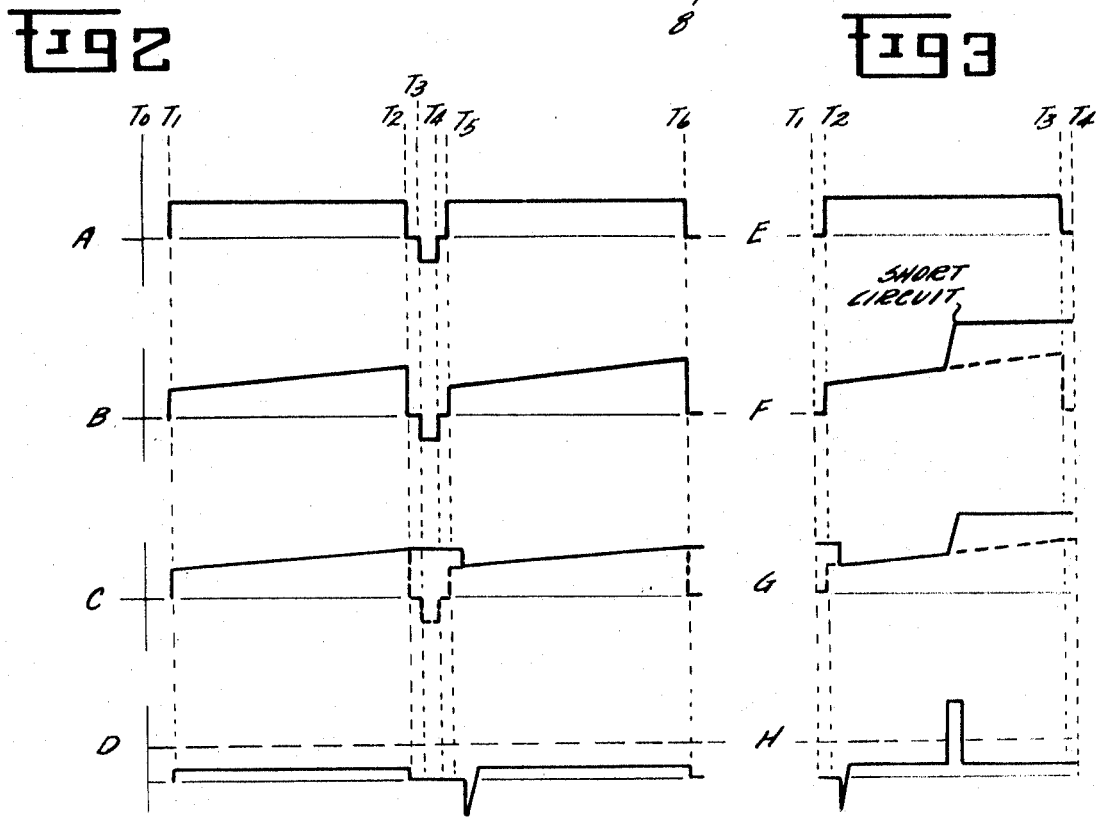

STEM OVERCURRENT PROTECTION

BACKGROUND OF THE INVENTION

1. Field of the Invention

This invention relates generally to a circuit utilized in the electrochemical machining process for protection against possible short circuits. Generally speaking, high overcurrents due to momentary but repetitive short circuits between the electrode and workpiece of an electrochemical apparatus will shorten the life of the electrode by erosion of the tip and can also result in damage to the workpiece. The invention utilizes an overcurrent monitoring system which continuously "tracks" the current in such a manner that short circuit currents are detected readily and the process "shut down" is initiated.

2. Description of Prior Art

Due to momentary and repetitive short circuits between an electrode and a workpiece, and due to sustained overcurrents, severe damage can be caused to the electrode and workpiece utilized in an electrochemical machining operation.

Simply stated, the electrode of an electrochemical machining process can be severely damaged by a destruction of its insulative coating or by a considerable shortening of its life through repeated spark erosion of its tip.

In order to minimize the damage to electrodes, the prior art utilized adjustable trip-point current relays of the meter type in order to sense an overcurrent. Due to the mechanical aspects of the relay, considerable skill was required to operate the relay effectively through each portion of the drill cycle.

Another approach utilized by the prior art was the use of a simple spark detection circuit in conjunction with the electrochemical apparatus. Again the prior art failed to provide an effective method of combating the problems, since this arrangement proved to be too sensitive and too susceptible to process produced transients.

SUMMARY OF THE INVENTION

As a result of the deficiencies noted above, prior art protection circuits have not been capable of providing 100 percent full time overcurrent protection for the electrochemical machining operation.

In the preferred embodiment disclosed herein, the invention relates to an overcurrent monitoring circuit which continuously "tracks" the electrode current through its normal variations over a complete electrochemical machining cycle. Specifically, the invention utilizes a sensing circuit, the output of which is placed into a "track and hold" sampling integrator circuit, thereby allowing the circuit to remain in an active condition in spite of the regular periodic voltage polarity reversals. Subsequently, the output of the integrator circuit passes through a differentiator circuit the output of which is compared to a reference voltage of a comparator circuit. If the pulse of the differentiator circuit exceeds the preset current reference, the power supply is caused to be disconnected from the equipment.

Accordingly, it is the primary object of this invention to continuously monitor the electrochemical machining process against possible short circuits by continuously comparing the current against a $\Delta I$ present reference level.

BRIEF DESCRIPTION OF THE DRAWINGS

FIG. 1 is a schematic circuit diagram of the invention;

FIG. 2 shows a time sequence diagram of current waveforms found within the circuit;

FIG. 3 shows a time sequence diagram of current waveforms depicting certain conditions of the circuit.

DESCRIPTION OF THE PREFERRED EMBODIMENT

Your attention is directed to the circuit diagram of FIG. 1 which shows a cutting tool 21 and workpiece 25 both being connected to the power supply 10 so as to function as electrodes wherein the electrode 22 within cutting tool 21 generally functions as a cathode and the workpiece 25 as the anode. The workpiece 25 is mounted within a container 20, said container being insulated from the ground. For a detailed explanation of the electrolytic process, your attention is directed to Patent application Ser. No. 474,833, filed on July 26, 1965, issued Sept. 24, 1968 as U.S. Pat. No. 3,403,084.

As noted, electrical energy is supplied to the cutting tool 21 and workpiece 25 by means of a power supply 10. For reasons specified hereinafter, power supply 10 may be any well-known "polarity reversing power means." Specifically, one terminal of said power supply 10 is connected directly to workpiece 25, the other terminal is connected by means of a current measuring means 15 to electrode 22 within cutting tool 21. The electrolyte which is caused to flow into the upper end of the cutting tool 21 (by means not shown) is electrically charged by coming in contact with electrode 22.

A "Track and Hold" sampling circuit, generally indicated in FIG. 1 by dashed lines and labeled as 5, is connected to the voltage potential developed across the current measuring means 15. Specifically, the "Track and Hold" sampling circuit consists of a differential type operational amplifier $A_1$, one terminal of which is connected to one terminal of the current measuring means 15, the other terminal being connected to a time constant circuit, the time constant being determined by resistor $R_3$ and capacitor $C_1$. In operation, the voltage developed across current measuring means 15 charges capacitor $C_1$ of the time constant circuit by means of contact $S_1$ which is closed by operation of relay $RY_1$. Upon the opening of contact $S_1$ the capacitor causes the output voltage of $A_1$ to be held constant until $S_1$ is again closed. The output of amplifier $A_1$, which is connected to ground by means of resistor $R_4$ is passed into a differentiating circuit. The differentiating circuit well known in the to and generally indicated in FIG. 1 by dashed lines and labeled as 6, comprises a capacitor $C_2$, one side of which is connected to ground by means of resistor $R_6$, and the other side of which is connected to the output of the "Track and Hold" sampling circuit by means of resistor $R_5$.

The output of the differentiating circuit is connected to a comparator circuit, generally indicated in FIG. 1 by dashed lines and labeled as 7. The comparator circuit comprises a second differential type solid-state amplifier $A_2$, one terminal of which is connected to the output of the differentiator circuit, the other terminal being connected to a DC source voltage by means of variable resistor $R_7$. The output of amplifier $A_2$ is connected to one terminal of relay $RY_2$, the other terminal being connected to ground.

In operation, amplifier $A_2$ energizes relay $RY_2$ when the input pulse from the differentiating circuit exceeds the present reference DC voltage level obtained by a preadjustment of potentiometer $R_7$. It is to be noted that relay $RY_2$ controls the contacts $S_2$.

Contacts $S_2$ are connected in a series arrangement through contacts $S_3$ to an enabling circuit 8. Contacts $S_3$ are closed upon the energization of relay $RY_3$ which is controlled by an "external timer" (not shown) said timer being activated after the power supply 10 has been turned on in order to preclude a possible shutdown of the equipment due to a "turn on surge."

Accordingly, it is noted that the enabling circuit 8 will be activated only if both sets of contacts $S_2$ and $S_3$ are closed. This will occur only if both relays $RY_2$ and $RY_3$ are caused to be energized. As stated above, in order to energize relays $RY_2$, the incoming pulse into amplifier $A_2$ must exceed the preset voltage level of the comparator circuit. In order to energize relay $RY_3$, the circuit must be operating for a period of time following the initial start-up of the process, said period being determined by a timer mechanism.

If the enabling circuit 8 is activated, for protection of the electrolytic process, the power supply 10 will be automatically disconnected from the workpiece 25 and electrode 22 of the cutting tool 21.

In order to more fully understand the operation of the circuit, your attention is directed to FIG. 2 which is a time sequence diagram of waveforms found within different parts of the circuit of FIG. 1.

For ease in understanding the waveforms, the waveforms of FIG. 2 have been broken up into a plurality of times represented by $T_0-T_6$. Waveform A depicts the voltage applied between the cutting tool 21 and workpiece 25 during a two cycle operation of the apparatus and process. Specifically, at time $T_1$, the voltage across the workpiece 25 and cutting tool 21, increases from 0 to a predetermined amount. Said voltage is impressed until time $T_2$ wherein it drops to 0 volts. During the interval between $T_3$ and $T_4$ the voltage reverses polarity. At $T_5$ the cycle is repeated wherein voltage at $T_5$ equals the original voltage at $T_1$.

Waveform B depicts the current flow associated with the voltage impressed between the workpiece 25 and cutting tool 21. At time $T_1$ the current responds to the voltage and increases gradually according to normal process characteristics until $T_2$. At $T_3$ due to polarity reversal, the current also reverses direction for a short interval of time, as shown by $T_4$. The current resumes its normal cycle of operation at $T_5$ corresponding to roughly the same value as at $T_1$.

Waveform C depicts the "Hold Features" of the "Tracking and Hold" sampling circuit. As noted in Waveform B, during the reversal of voltage the current flow would also reverse direction between $T_3$ and $T_4$. In order to continue the monitoring function of the circuit, the time circuit of the "Track and Hold" circuit maintains the output voltage of Amplifier A at its predetermined level as noted by the solid line. The dotted lines represent the change of voltage which would normally be experienced if the time circuit was not utilized. Accordingly, Waveform C as depicted is the waveform found at the output of the "Track and Hold" sample circuit.

Waveform D depicts the current waveform at the output of the differentiator circuit and at the input of amplifier $A_2$ of the comparator circuit. The dotted line represents the constant reference level as found within the comparator circuit. Accordingly, FIG. 2 generally represents the wave patterns of a circuit wherein no short circuits are occurring since the waveform at the input to Amplifier $A_2$ does not exceed the present reference level, as clearly shown in Waveform D.

FIG. 3 represents the waveforms as may be experienced should a short circuit occur within the operation of the electrolytic process and wherein the power supply is disconnected from the apparatus.

Waveform E represents the voltage between the workpiece 25 and cutting tool 21, between the time interval $T_2-T_3$.

Waveforms F-G depict the sudden increase in current flow which would occur with a short circuit or partial sudden overload of the circuit. The dotted line represents the normal current without a short circuit. Waveform G further represents the action of the "holding circuit" within the track and hold sample circuit wherein the current does not reverse direction with a reversal of voltage as previously explained.

Your attention is now directed to Waveform H which graphically portrays the current waveform at the input to the amplifier $A_2$ of the comparator circuit. It is noted that the current, after passing through the differentiator circuit, will, at the time the short circuit occurs, exceed the preset voltage level (as depicted in the graph by a dotted line) and thereby produce an output signal which energizes relay $RY_2$. Upon energization $RY_2$ contact $S_2$, which is controlled by relay $RY_2$, will close covering the "enable" circuit to produce an output which will disconnect the power supply 10 from the electrolytic apparatus.

It will thus be appreciated that the unique circuit arrangement provides for constant monitoring of the electrochemical machining operation for protection against possible short circuits within said operation.

While preferred embodiments of the invention have been illustrated and described above, it will be understood that various changes and modifications may be made without departing from the spirit and scope of the invention, and it is intended to cover all such changes and modifications by the appended claims.

What is claimed as new and is desired to secure by Letters Patent of the United States is:

1. A sensing apparatus for an electrochemical machining process comprising:
    a current detecting means,
    a sampling integrator means connected across the current detecting means,
    a differentiator means connected to the output of the sampling integrator means,
    a comparator means for comparing the output of the differentiator means with a predetermined reference, whereby an output pulse for disenabling the electrochemical machining process is obtained from the comparator means if the output of the differentiator means exceed the predetermined reference.

2. A sensing apparatus as defined by claim 1 in which the sampling integrator means includes a track and hold circuit in order that the sampling integrator means may continue operation during predetermined intervals of voltage reversals.

3. A sensing apparatus as defined by claim 2 in which the sampling means and comparator means both include operational type amplifiers.

* * * * *